United States Patent
Vlasak et al.

(10) Patent No.: US 10,477,667 B2
(45) Date of Patent: Nov. 12, 2019

(54) AUTOMATIC RELOADING AND TRANSPORT SYSTEM FOR SOLID TARGETS

(71) Applicant: SOLETANCHE FREYSSINET, Rueil Malmaison (FR)

(72) Inventors: Frantisek Vlasak, Trebic (CZ); Pavel Jelinek, Trebic (CZ)

(73) Assignee: SOLETANCHE FREYSSINET, Rueil Malmaison (FR)

(*) Notice: Subject to any disclaimer, the term of this patent is extended or adjusted under 35 U.S.C. 154(b) by 0 days.

(21) Appl. No.: 16/164,521

(22) Filed: Oct. 18, 2018

(65) Prior Publication Data

US 2019/0124755 A1    Apr. 25, 2019

(30) Foreign Application Priority Data

Oct. 20, 2017 (EP) .................................. 17306451

(51) Int. Cl.
| | |
|---|---|
| H05H 7/00 | (2006.01) |
| H05H 13/00 | (2006.01) |
| G21K 5/10 | (2006.01) |
| G21F 7/06 | (2006.01) |
| G21G 1/00 | (2006.01) |
| G21K 5/08 | (2006.01) |
| H05H 6/00 | (2006.01) |
| B65G 51/04 | (2006.01) |
| G21G 1/10 | (2006.01) |

(52) U.S. Cl.
CPC ............. *H05H 7/001* (2013.01); *B65G 51/04* (2013.01); *G21F 7/06* (2013.01); *G21G 1/00* (2013.01); *G21K 5/08* (2013.01); *H05H 6/00* (2013.01); *H05H 13/005* (2013.01); *G21G 1/10* (2013.01); *G21K 5/10* (2013.01)

(58) Field of Classification Search
CPC ...... H05H 7/001; H05H 13/005; B65G 51/04; G21K 5/10
USPC ...................................... 315/500; 250/442.11
See application file for complete search history.

(56) References Cited

U.S. PATENT DOCUMENTS

| | | | |
|---|---|---|---|
| 3,549,492 A | 12/1970 | Ricci et al. | |
| 5,608,224 A * | 3/1997 | Alvord | G21K 5/08 250/442.11 |
| 5,854,531 A * | 12/1998 | Young | H05H 7/06 313/362.1 |
| 2005/0286675 A1 | 12/2005 | Kang et al. | |
| 2006/0285624 A1 * | 12/2006 | Williamson | H05H 7/00 376/202 |

FOREIGN PATENT DOCUMENTS

| | | |
|---|---|---|
| JP | 2011-153827 A | 8/2011 |
| WO | 97/07122 A2 | 2/1997 |
| WO | 2014/186898 A1 | 11/2014 |

\* cited by examiner

*Primary Examiner* — Daniel D Chang
(74) *Attorney, Agent, or Firm* — Dentons US LLP (57) ABSTRACT

An automatic reloading and transport system for solid targets for a particle accelerator using a pneumatic tube transport system from the point of target activation by a particle accelerator to a target processing point and back, comprising a pneumatic tube transport system with end stations for receipt and dispatch of a capsule accommodating the target, a handling mechanism for both manipulating the solid target and handling the capsule and a target positioning system.

15 Claims, 7 Drawing Sheets

AUTOMATIC RELOADING AND TRANSPORT SYSTEM FOR SOLID TARGETS

The present application claims the benefit of priority to European Patent Application No. 17306451.0 filed Oct. 20, 2017, which is hereby incorporated by reference in its entirety.

FIELD OF THE INVENTION

The invention relates to a solid targets reloading and transport system for linear and circular types of fixed target particle accelerators.

BACKGROUND OF THE INVENTION

Particle accelerators are used industrially to irradiate a solid target material. A system is needed to place the target material in front of the beam of accelerated particles, keep it there during irradiation, and remove the radionuclide product from the target material quickly and efficiently at the processing point located at distance from the particle accelerator. The target material is typically manually loaded into the particle accelerator system. The irradiated target material is then transported to a shielded transport container either manually or semi-automatically. The shielding box is transported manually to the target processing point and at the processing point targets are again handled manually or semi-automatically.

The overall process is time demanding and results in an operator contact with the activated targets. Additionally, there is a growing demand for radioisotopes and many existing facilities need to increase the number of radioisotopes being produced.

SUMMARY OF THE INVENTION

One objective of the present invention is to remedy these drawbacks. According to one embodiment, the invention proposes an automatic reloading and transport system for handling solid targets for a particle accelerator, comprising:
- a capsule configured to accommodate at least one solid target;
- a pneumatic tube transport system comprising at least two end stations each configured to dock and undock the capsule;
- a handling mechanism to open and close the capsule and to move the target from or to the open capsule;
- a target positioning device configured to receive the target from the handling mechanism and move the target to a position for receiving a beam of accelerated particles from the particle accelerator.

Upon irradiation of the target by the beam of accelerated particles, the target positioning device is configured to move the target back to a position for target manipulation by the handling mechanism.

The pneumatic tube transport system may be configured to transport the solid targets from the point of irradiation at the particle accelerator to a target processing point and from the target processing point back to the point of irradiation.

In one particular embodiment the automatic reloading and transport system for solid targets may be used for circular or linear types of a particle accelerator. The non-exhaustive list of possible types of such particle accelerators comprises of cyclotron, synchrotron, electron synchrotrons, fixed-field alternating gradient accelerators and linac type accelerators.

Whilst in the preferred embodiment the cyclotron may be the choice of an accelerator, other accelerators may become more common with the development of smaller, more reliable, machines.

In another particular embodiment the automatic reloading and transport system for solid targets for a particle accelerator may be used in production of radioisotopes for the physical and biological sciences namely for use in imaging, radiotherapy and radiotracers. The use of the system in imaging may be further divided into use in production of radioisotopes for positron emission tomography (PET) or single photon emission computed tomography (SPECT).

In another particular embodiment the automatic reloading and transport system for solid targets for a particle accelerator is configured for use with solid targets that have an active face comprising of foiled, electroplated, vacuum evaporated or sputtered active material.

BRIEF DESCRIPTION OF THE DRAWINGS

Other features and advantages of the invention appear from the following detailed description of several embodiments thereof, given by way of non-limiting examples, and with reference to the accompanying drawings.

In the drawings.

MORE DETAILED DESCRIPTION

I. Overview

Figure 1:
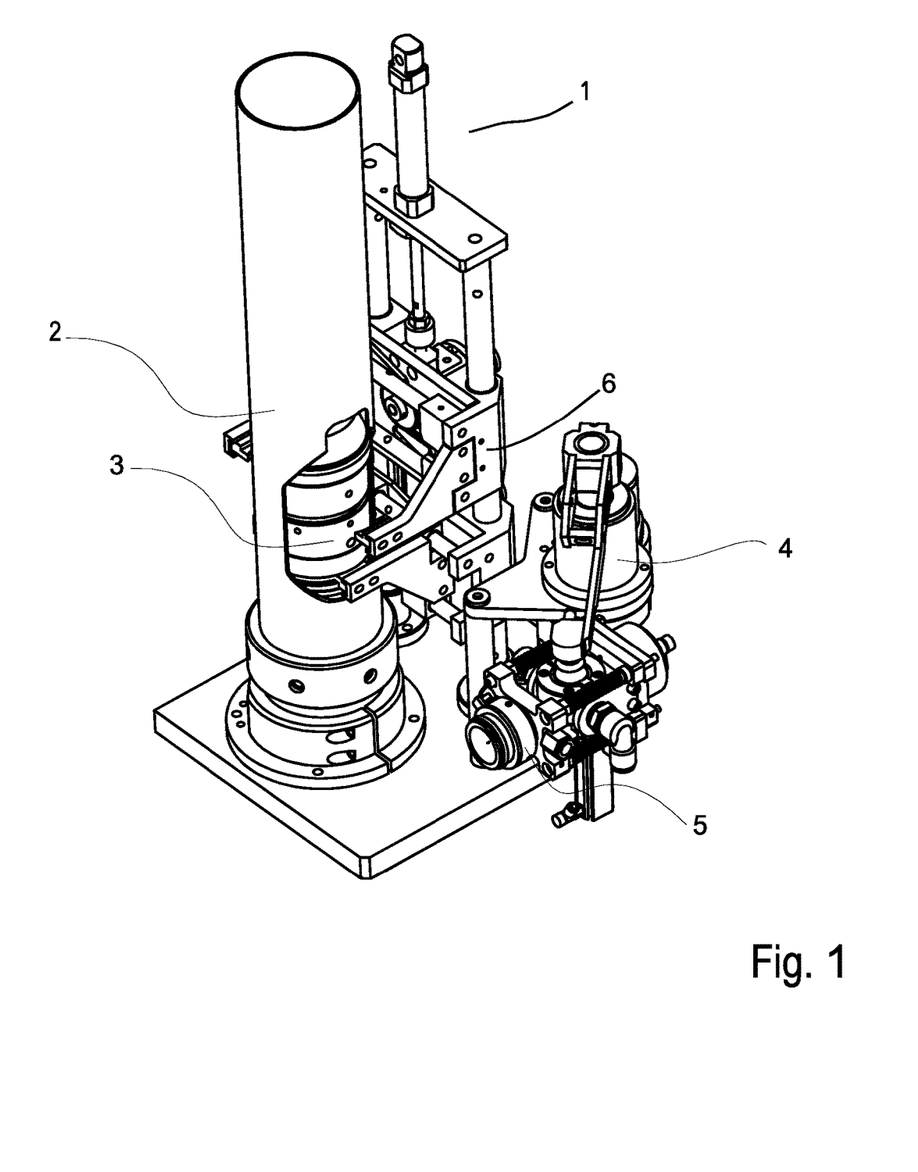
FIG. 1 is a perspective view showing an overall layout of the end station of the pneumatic tube transport system according to a first embodiment of the invention.

The automatic reloading and transport system for handling solid targets for a particle accelerator comprises:
- a target capsule 3 for accommodating a solid target;
- a pneumatic tube transport system comprising end stations 1, one of which is shown in FIG. 1, where the target capsule 3 can be docked and undocked, and a pneumatic tube between the end stations;

a handling mechanism 4, 6 at the end station 1 to open and close the target capsule 3, and to move the target from or to the open capsule;

a target positioning device 5 to receive the target 411 from the handling mechanism 6 and move the target 411 into an appropriate position for receiving the beam of accelerated particles from the particle accelerator.

After the target is irradiated, the target positioning device moves the target back to the position for target manipulation by the handling mechanism.

The target capsule may serve to accommodate and transport the solid target via the pneumatic tube system provided between the end stations. One of the end stations may be located at the particle accelerator point, while another end station may be located at a target processing point (not shown).

In one example, the target capsule is loaded with a non-activated solid target at the target processing point and is send via the pneumatic tube transport system to reach the end station at the particle accelerator point. Upon arrival at the end station, the handling mechanism unlocks and opens the capsule and moves the solid target from the capsule to a target positioning device. The target positioning device then moves the target into the position for an irradiation by the beam of the accelerated particles outputted by the particle accelerator.

When the irradiation of the solid target is completed the target is removed from the target positioning device and moved back to the opened capsule by the handling mechanism, the handling mechanism closes and locks the capsule and the capsule is sent back to the target processing point via the pneumatic tube transport system.

At the target processing point the capsule is unlocked and opened by the handling mechanism and the target is moved from the capsule to the target port of the target processing unit (not shown). The target processing deactivates the solid target, and the handling mechanism moves it from the target port at the processing unit back inside of the opened capsule. Then the target mechanism closes and secures the capsule and the capsule is send via the transport system back to the particle accelerator point.

In another example, the transport system also enables transport of irradiated targets from a plurality of points of irradiation provided by at least one particle accelerator to at least one processing point and back.

The transport system may be also configured to enable a transport of targets from at least one processing point to the point of the target irradiation. The point of irradiation may be an output port of the particle accelerator. The point of irradiation may also be an output from a beam selector that is attached to or otherwise integrated into the particle accelerator.

The pneumatic tube transport system may have a target capsule that comprises a securing mechanism adapted to lock and unlock the capsule a top piece adapted to be engaged by the securing mechanism and a bottom piece comprising the securing mechanism. The securing mechanism of the target capsule may further comprises a spring loaded latch system, wherein when the top and bottom piece of the target capsule are pushed together the latch system is configured engage the top piece of the target capsule and lock both pieces together, wherein the latch system further comprises an unlocking feature configured to release the spring load of the latches and unlock the capsule in response to the capsule being moved against the end bottom part of the pneumatic tube transport system.

The handling mechanism may include plurality of movable jaws configured to engage the top piece and the bottom piece of the target capsule, wherein the jaws are configured to move whole target capsule to engage unlocking feature of the capsule. The jaws may be further configured to pull the top and bottom piece of the target capsule away from each other to open the capsule or push the top and bottom piece of the target capsule together to lock the target capsule.

The handling mechanism may also comprise a target manipulator that may include an arm and at least one suction cup located at the end of the arm, wherein the suction cup may be adapted to apply a negative gas pressure to adhere to a surface of the solid target and enable manipulation of the target. The gas used may be air or other type of gas. The target manipulator may be adapted to move rotationally about its axis to manipulate the solid target from or to the open capsule. The rotational movement may be in horizontal plane. The rotational movement may be coplanar to both the location of a target holder within the processing unit and the top of the target positioning device. The rotational movement may be coplanar to either the location of a target holder within the processing unit or the top of the target positioning device. The target manipulator may be further configured to move perpendicularly to the axis of the rotation.

The target manipulator may be adapted to manipulate the solid target from the open target capsule directly to an input port of the solid target processing system and back. The target manipulator may be also adapted to manipulate the solid target from the open target capsule directly to the target positioning device and back.

In one particular embodiment the target positioning device may comprises an input port having a first sealing system to create a sealed connection between a beam port or a beam selector port of the particle accelerator and the positioning device. The positioning device further comprises a target holder for receiving the solid target from the manipulator and pivot about an axis to place the active face of the solid target to be in position to receive the beam of accelerated particles from the particle accelerator and a second sealing system configured to create a sealed connection between the active face of the solid target and the input port. The second sealing system may have a compression seal feature located at the input port of the positioning device and a mechanism adapted to move the pivoted target holder to engage and disengage the compression seal feature.

The target holder may pivot about its axis so the target active face is placed perpendicularly to the output beam of the particle accelerator. The target holder may also position the target active face to face the output beam of the particle accelerator under an angle. The target holder may also rotate the target when the target active face being exposed to the output beam of the particle accelerator. The target holder may receive both low and high energy targets with variety of shapes. In one example the target shapes may be cylindrical or oval.

II. Figures Description

Figure 2:
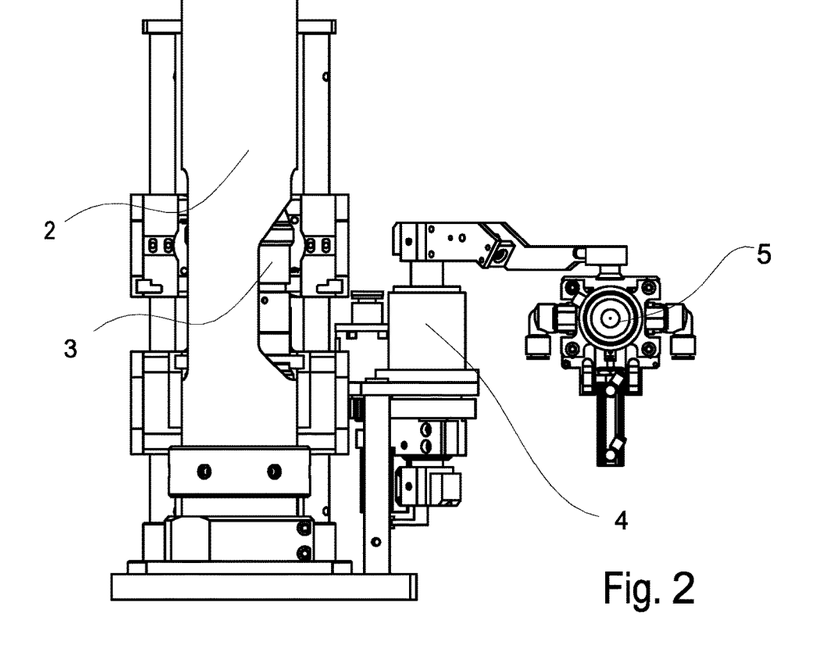
FIG. 2 is a side view of the end station of FIG. 1.
Figure 3:
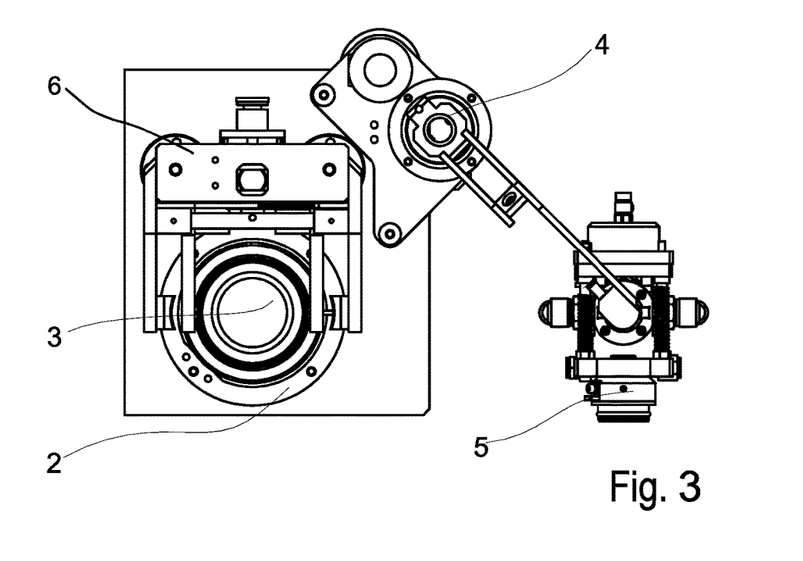
FIG. 3 is a top view of the end station of FIG. 1.

FIGS. 1, 2 and 3 depict a possible embodiment of an end station 1 of the pneumatic tube transport system 2 with a capsule 3 at the particle accelerator point. The figures further depict the handling mechanism 4, 6 that comprises of two sub-mechanisms, a first sub-mechanism 6 that serves to handle; unlock, lock, open and close the capsule and a second sub-mechanism 4 that serves to manipulate the target from and to the capsule.

Figure 4:
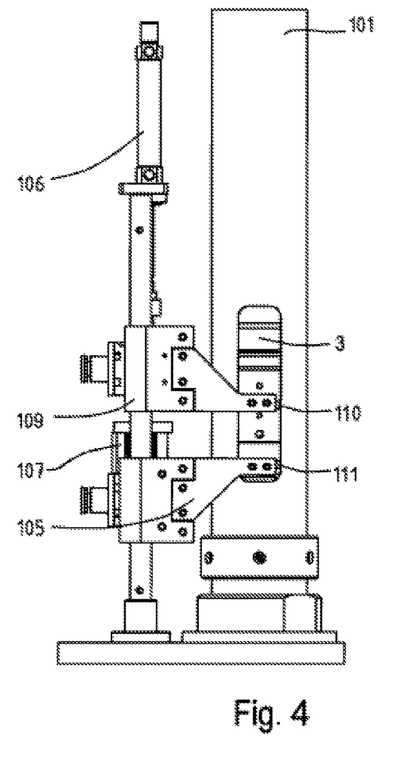
FIG. 4 is a side view of the locked target capsule docked within the end station.
Figure 5:
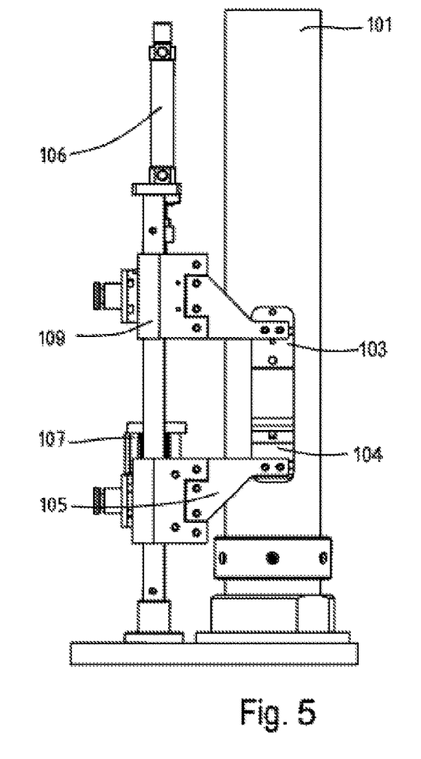
FIG. 5 is a side view of the opened target capsule docked within the end station.
Figure 6:
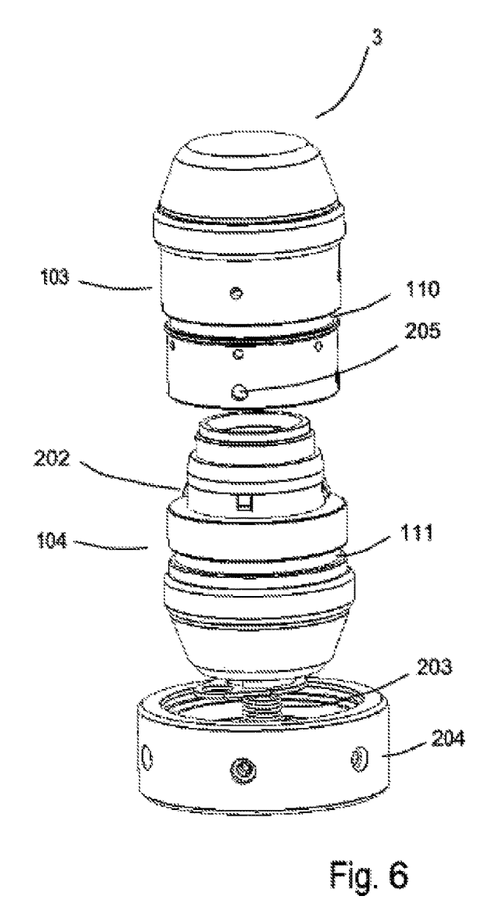
FIG. 6 is perspective detail of the open target capsule.
Figure 7:
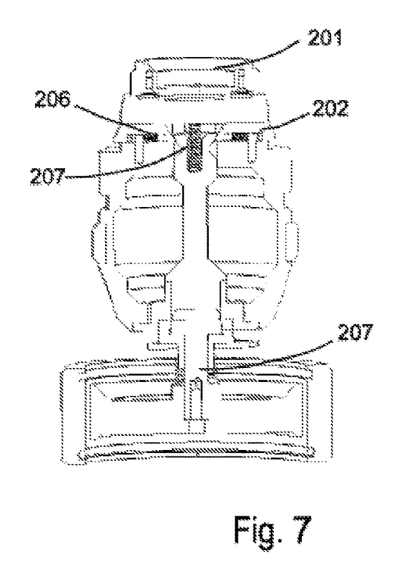
FIG. 7 is a sectioned view of the bottom piece of the capsule.

FIGS. 4 and 5 depict the closed and open capsule docket inside the pneumatic tube transport system 101. FIG. 4 depicts moveable jaws 105, 109 of the handling mechanism. The moveable jaws 105, 109 are made to engage the slots 110, 111 of the capsule when in closed position. In an open position the jaws fully release the capsule. In the depicted position of being closed the jaws engaging slots 110, 111 located in the top 103 and bottom 104 piece of the target capsule 3. To unlock the capsule 3 the pneumatic stop 107 is vented and the pneumatic cylinder 106 attached to the jaws 105, 109 moves the jaws and capsule downwards to unlock the capsule. FIGS. 6 and 7 further elaborates the process of locking and unlocking the capsule. When the capsule is unlocked the bottom jaw 105 retains the bottom of the capsule and upper jaw 109 moves upwards away from the bottom jaw causing the capsule to open and enable access to the target manipulator to manipulate the target either to or from the capsule.

FIGS. 6 and 7 depict the target capsule 3. The top piece of the capsule 103 includes a retaining features 205 to be engaged by the securing mechanism for closing and unlocking the capsule 3. The retaining feature may be for example in the form of at least one of holes, slots, hook or any other suitable shape. The bottom part 104 of the capsule 3 comprising the securing mechanism having a latch system 202 to engage the retaining feature 205 of the top piece 103 of the capsule. The securing mechanism system has plurality of spring elements 203, 207 and 206 ensuring pre-load for the latch 202. The mechanism further comprises of shaft 207 that disengages the latch 202 in response to the capsule being moved by the jaws 105, 109 against the end bottom part 204 of the pneumatic tube transport system.

Figure 8:
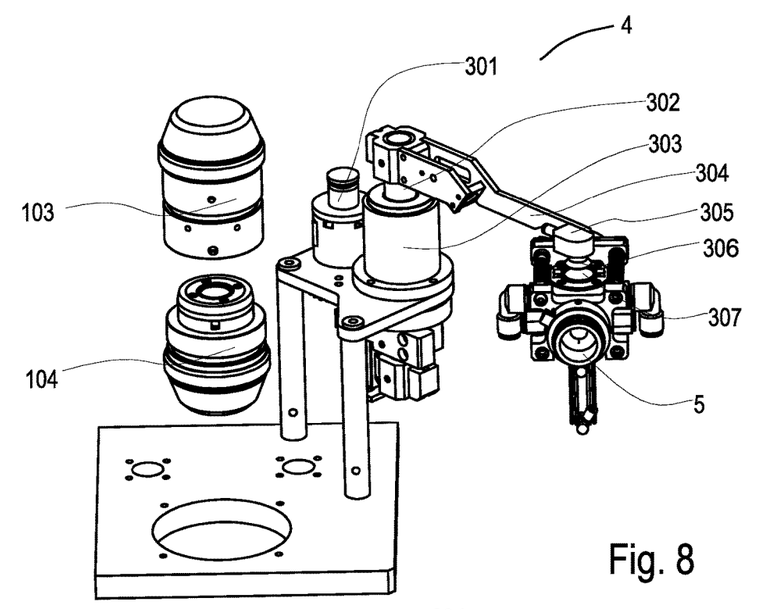
FIG. 8 is a perspective detail of the open target capsule and the target manipulator engaging the solid target from the target holder in the target positioning device.
Figure 9:
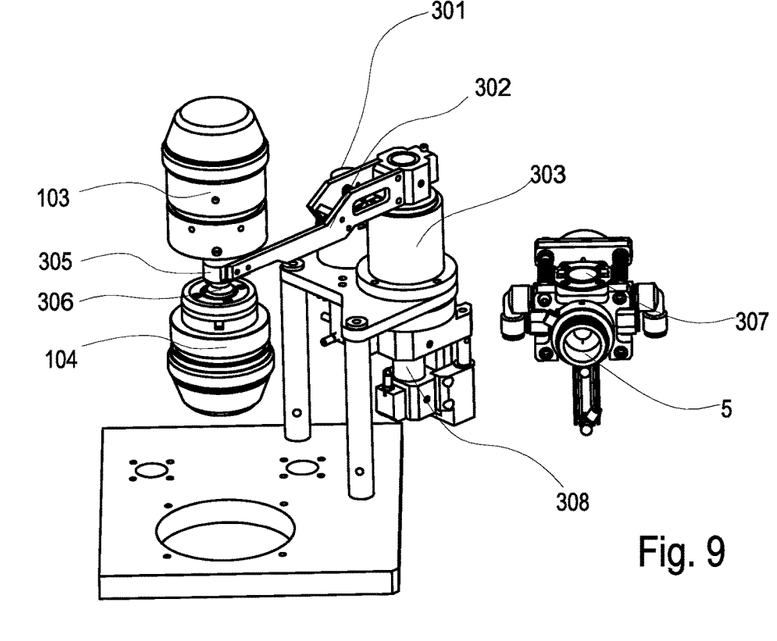
FIG. 9 is a perspective detail of the open target capsule and the target manipulator placing the solid target the capsule.

FIGS. 8 and 9 depict the target manipulator 4 of the target handling mechanism. The target manipulator 4 has a rotational drive device 308 providing a rotational movement for the manipulator, the device may be a pneumatic, hydraulic or an electrically driven. In one example the drive device 308 may be a pneumatic or electrical motor. The motor may be further equipped with a gearbox and end stops to govern the movement. The motor may be also a stepper motor. The target manipulator 4 further comprises a linear drive device 301 configured to provide up and down movement in addition to the rotational movement to a shaft 302, the linear drive device 301 may be a pneumatically, hydraulically or an electrically driven. The enclosure 303 is configured to enable both rotational as well as linear up and down movement of the drive shaft 302. The drive shaft 302 has an arm 304 connected to it. At the end of the arm 304 there is a suction cup 305 or other means to enable manipulation of the solid target. The arm 304 of the target manipulator is configured to move rotationally between the target holder 307 in the target positioning device 5 and target holder 306 inside of the bottom part 104 of the target capsule 3. The arm 304 is further configured to move up when removing the solid target from the target holder 307, 306 and move down when placing the solid target into the target holder 307, 306.

Figure 10:
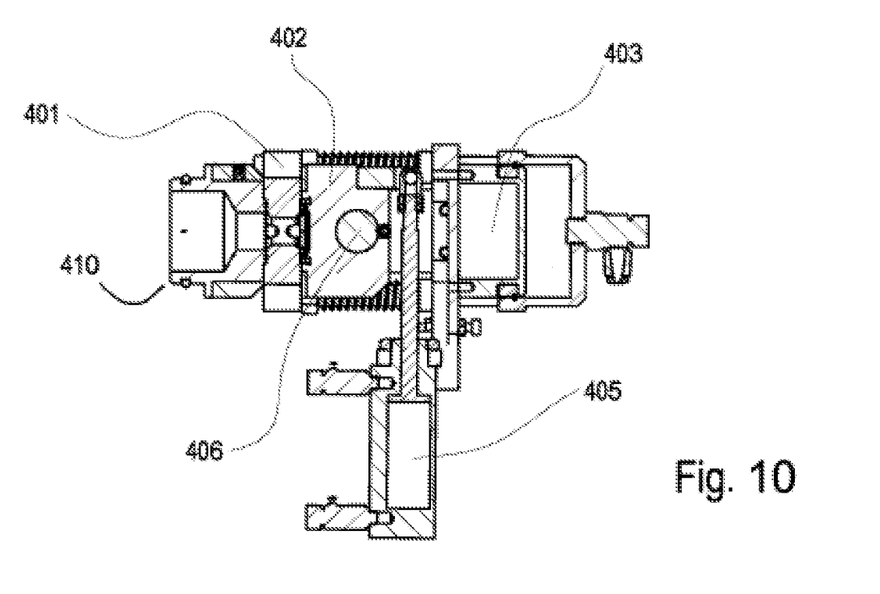
FIG. 10 is a sectioned side view of the target positioning device with the target holder pivoted to place the active face of the solid target in position to receive the beam of accelerated particles.
Figure 11:
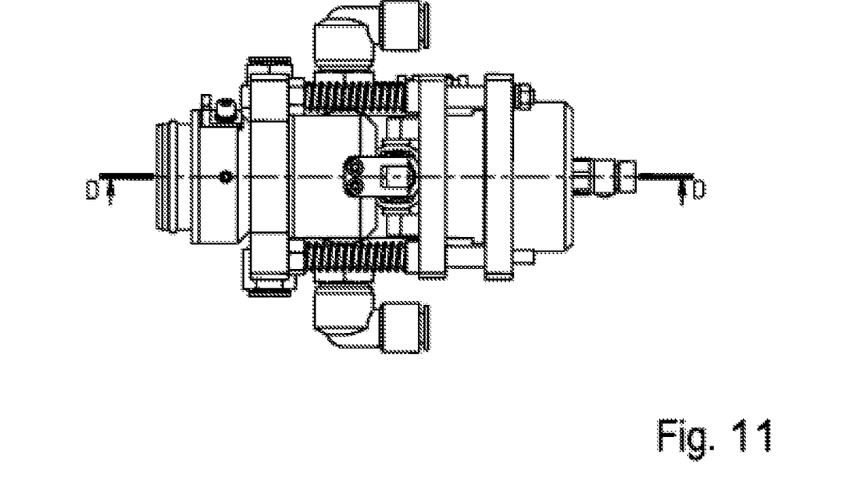
FIG. 11 is a top view of the target positioning device of FIG. 10.

FIGS. 10 and 11 depict the target positioning mechanism 5 in a closed position having the active face of the solid target in position to receive the beam of accelerated particles from the particle accelerator via sealed input port 410. The target positioning mechanism 5 comprises of a linear movement means that may be a pneumatic cylinder 405. The linear movement means 405 is connected to the target holder 402 and causes the holder to pivot the target holder 402 about a pin 406 in order to close a target chamber 401 and place the active face of the target in position to receive the beam of accelerated particles from the input port. The target chamber 401 is a part of the input port 410 and is formed on the opposite side to the beam receiving side of the input port. The target chamber 401 is then sealed by a linear drive means formed for instance by a pneumatically driven piston 403 configured to move the target holder 402 against the wall of the target chamber 401. The target chamber wall features a compression sealing surface means that may be formed by an o-ring, gasket, lip seal or similar sealing types.

Figure 12:
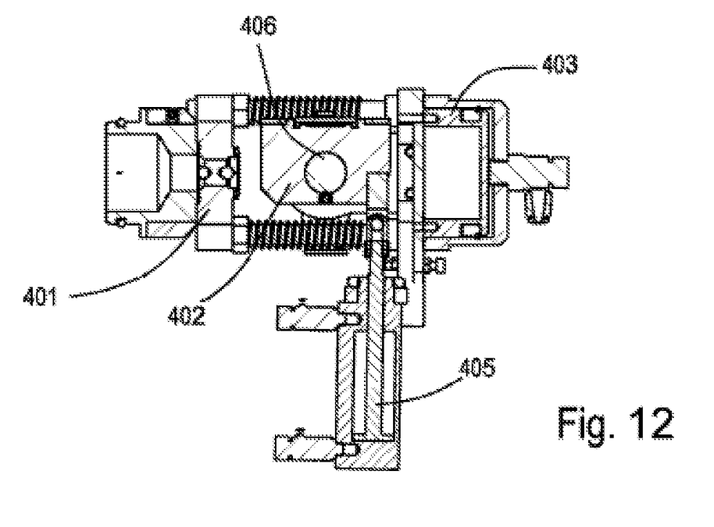
FIG. 12 is a sectioned side view of the target positioning device with the target holder pivoted to enable the solid target manipulation by the target manipulator.
Figure 13:
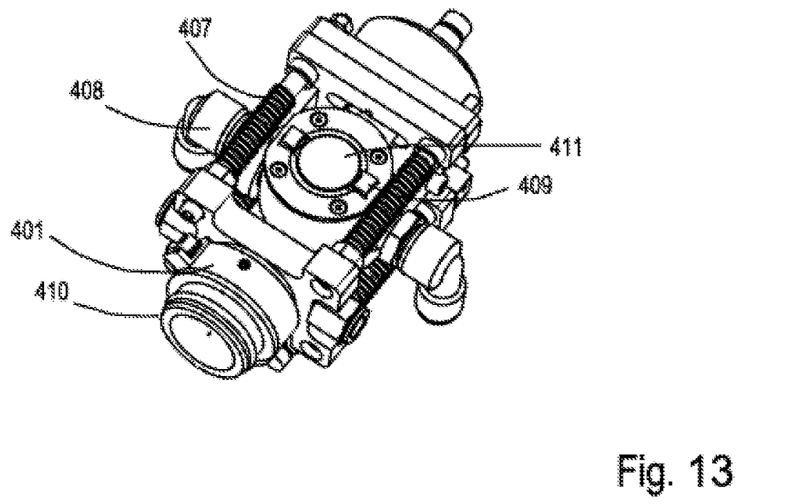
FIG. 13 is a perspective view showing the target positioning device with the target holder pivoted to enable the solid target manipulation by the target manipulator.

FIGS. 12 and 13 depict the target positioning mechanism 5 in an open position for either solid target placement or removal. In the depicted example upon irradiation of the target the linear movement means 405 pivots the target holder 402 about a pin 406 to move the irradiated solid target to the position 411 where the target manipulator 4 can access it via the suction cup 305 or other means enabling the manipulation of the solid target. The target positioning system may comprise at least one spring element 407 to provide an automatic return and unsealing of the target holder when the pneumatic driven piston 403 is deactivated. The target holder may comprise set of fingers 409. The fingers 409 may be mechanically controlled so that they hold the target within the target holder when the holder is being pivoted or the target positioning mechanism is in the close position.

The invention claimed is:

1. An automatic reloading and transport system for handling solid targets for a particle accelerator, comprising:
   a capsule configured to accommodate at least one solid target;
   a pneumatic tube transport system comprising at least two end stations each configured to dock and undock the capsule;
   a handling mechanism to open and close the capsule, and to move the target from or to the open capsule;
   a target positioning device configured to receive the target from the handling mechanism and move the target to a position for receiving a beam of accelerated particles from the particle accelerator, wherein upon irradiation of the target by the beam of accelerated particles, the target positioning device is configured to move the target back to a position for target manipulation by the handling mechanism.

2. The system of claim 1, wherein the particle accelerator is a cyclotron.

3. The system of claim 1, for use with solid targets that have an active face comprising a foiled, electroplated, vacuum evaporated or sputtered active material.

4. The system of claim 1, wherein the pneumatic tube transport system is configured to transport the solid target from a point of irradiation at the particle accelerator to a target processing point and from the target processing point back to the point of irradiation.

5. The system of claim 1, wherein the capsule comprises:
   a securing mechanism adapted to lock and unlock the capsule;
   a top piece adapted to be engaged by the securing mechanism; and
   a bottom piece adapted to hold the target, wherein the bottom piece comprises the securing mechanism.

6. The system of claim 5, wherein the securing mechanism of the capsule further comprises a spring loaded latch system, wherein when the top and bottom piece of the capsule are pushed together the spring loaded latch system is configured engage the top piece of the capsule and lock both pieces together, wherein the spring loaded latch system further comprises an unlocking feature configured to release the spring load of latches of the spring loaded latch system and unlock the capsule in response to the capsule being moved against the end bottom part of the pneumatic tube transport system.

7. The system of claim 5, wherein the handling mechanism includes a plurality of movable jaws configured to engage the top piece and the bottom piece of the capsule, wherein the jaws are configured to move whole capsule to engage unlocking feature of the capsule and to pull the top and bottom piece of the capsule away from each other to open the capsule or push the top and bottom piece of the capsule together to lock the capsule.

8. The system of claim 1, wherein the handling mechanism comprises a target manipulator that includes an arm and at least one suction cup located at the end of the arm, wherein the suction cup is adapted to apply a negative gas pressure to adhere to a surface of the solid target and enable manipulation of the target.

9. The system of claim 8, wherein the target manipulator is adapted to move rotationally about its axis to manipulate the solid target from or to the open capsule, wherein the target manipulator is further configured to move linearly up and down to enable the target removal from target holders.

10. The system of claim 9, wherein the target manipulator is adapted to manipulate the solid target from the open capsule directly to a target port of the solid target processing system and back.

11. The system of claim 8, wherein the target positioning device comprises:

an input port having a first sealing system adapted to create a sealed connection between a beam port or a beam selector port of the particle accelerator and the target positioning device;

a target holder configured to receive the solid target from the manipulator and pivot about an axis to place an active face of the solid target to be in position to receive the beam of accelerated particles; and a second sealing system configured to create a sealed interface between the active face of the solid target and the input port.

12. The system of claim 11, wherein the target holder is configured to pivot about the axis so that the active face of the solid target is placed perpendicularly to the beam of accelerated particles.

13. The system of claim 11, wherein the target holder is configured to position the active face of the solid target in front of the beam of accelerated particles under an angle, wherein the target holder is further configured to rotate the target when exposed to the beam of accelerated particles.

14. The system of claim 11, wherein the second sealing system comprises a compression seal feature located at the input port of the target positioning device and a mechanism adapted to move the pivoted target holder to engage and disengage the compression seal feature.

15. The system of claim 11, wherein the target holder further comprises a set of fingers configured to be mechanically controlled so that they hold the target within the target holder when the holder is being pivoted or the target positioning mechanism is in the close position.

* * * * *